US011405630B2

(12) United States Patent
Lee et al.

(10) Patent No.: US 11,405,630 B2
(45) Date of Patent: Aug. 2, 2022

(54) VIDEO DECODING METHOD FOR DECODING PART OF BITSTREAM TO GENERATE PROJECTION-BASED FRAME WITH CONSTRAINED PICTURE SIZE AND ASSOCIATED ELECTRONIC DEVICE

(71) Applicant: MEDIATEK INC., Hsin-Chu (TW)

(72) Inventors: Ya-Hsuan Lee, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/372,515

(22) Filed: Jul. 11, 2021

(65) Prior Publication Data

US 2021/0337230 A1 Oct. 28, 2021

Related U.S. Application Data

(62) Division of application No. 17/075,724, filed on Oct. 21, 2020, now Pat. No. 11,095,912.

(60) Provisional application No. 62/926,600, filed on Oct. 28, 2019, provisional application No. 63/042,610, filed on Jun. 23, 2020.

(51) Int. Cl.
*H04N 19/00* (2014.01)
*H04N 19/44* (2014.01)
*H04N 19/169* (2014.01)
*H04N 19/186* (2014.01)
*H04N 19/132* (2014.01)

(52) U.S. Cl.
CPC .......... *H04N 19/44* (2014.11); *H04N 19/132* (2014.11); *H04N 19/186* (2014.11); *H04N 19/1883* (2014.11)

(58) Field of Classification Search
CPC .... H04N 19/44; H04N 19/132; H04N 19/186; H04N 19/1883
See application file for complete search history.

(56) References Cited

U.S. PATENT DOCUMENTS

| 2018/0054613 A1 | 2/2018 | Lin |
| 2018/0091577 A1 | 3/2018 | Park |
| 2019/0200023 A1* | 6/2019 | Hanhart ............... H04N 19/167 |

(Continued)

FOREIGN PATENT DOCUMENTS

| CN | 106162139 A | 11/2016 |
| WO | 2018/233661 A1 | 12/2018 |
| WO | 2019/062714 A1 | 4/2019 |

OTHER PUBLICATIONS

"International Search Report" dated Jan. 29, 2021 for International application No. PCT/CN2020/124315, International filing date:Oct. 28, 2020.

*Primary Examiner* — Zhihan Zhou
(74) *Attorney, Agent, or Firm* — Winston Hsu

(57) ABSTRACT

A video decoding method includes decoding a part of a bitstream to generate a decoded frame, wherein the decoded frame is a projection-based frame that includes a plurality of projection faces packed in a projection layout with M projection face columns and N projection face rows, M and N are positive integers, and at least a portion of a 360-degree content of a sphere is mapped to the plurality of projection faces via projection. Regarding the decoded frame, a picture width excluding guard band samples is equal to an integer multiple of M, and a picture height excluding guard band samples is equal to an integer multiple of N.

12 Claims, 8 Drawing Sheets

(56) References Cited

U.S. PATENT DOCUMENTS

| | | |
|---|---|---|
| 2019/0222822 A1 | 7/2019 | Wang |
| 2020/0260063 A1* | 8/2020 | Hannuksela ....... H04N 21/8456 |
| 2020/0275129 A1* | 8/2020 | Deshpande .......... H04N 19/186 |
| 2022/0007053 A1* | 1/2022 | Hanhart ............... H04N 19/597 |

* cited by examiner

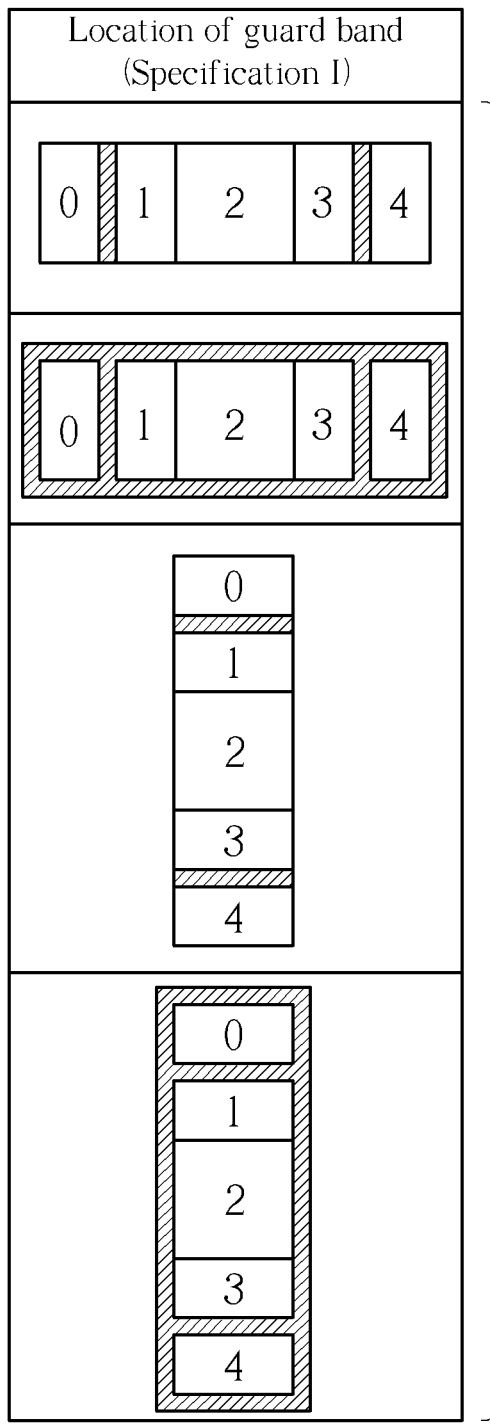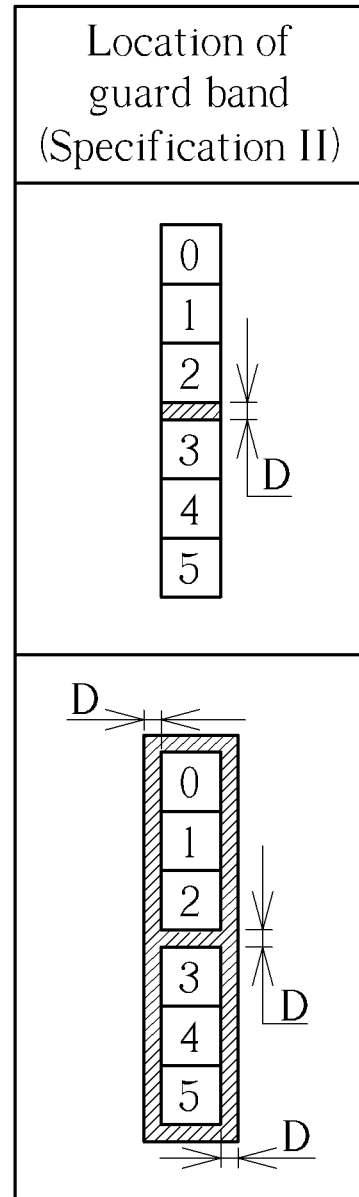
FIG. 6
FIG. 7

VIDEO DECODING METHOD FOR DECODING PART OF BITSTREAM TO GENERATE PROJECTION-BASED FRAME WITH CONSTRAINED PICTURE SIZE AND ASSOCIATED ELECTRONIC DEVICE

CROSS REFERENCE TO RELATED APPLICATION

This is a divisional application of U.S. patent application Ser. No. 17/075,724 filed on Oct. 21, 2020, which claims the benefit of U.S. provisional application No. 62/926,600 filed on Oct. 28, 2019 and U.S. provisional application No. 63/042,610 filed on Jun. 23, 2020. The entire contents of the related applications, including U.S. patent application Ser. No. 17/075,724, U.S. provisional application No. 62/926,600 and U.S. provisional application No. 63/042,610, are incorporated herein by reference.

BACKGROUND

The present invention relates to video processing, and more particularly, to a video decoding method for decoding a part of a bitstream to generate a projection-based frame with a constrained picture size and an associated electronic device.

Virtual reality (VR) with head-mounted displays (HMDs) is associated with a variety of applications. The ability to show wide field of view content to a user can be used to provide immersive visual experiences. A real-world environment has to be captured in all directions, resulting in an omnidirectional video corresponding to a viewing sphere. With advances in camera rigs and HMDs, the delivery of VR content may soon become the bottleneck due to the high bitrate required for representing such a 360-degree content. When the resolution of the omnidirectional video is 4K or higher, data compression/encoding is critical to bitrate reduction.

In general, the omnidirectional video corresponding to a sphere is transformed into a frame with a 360-degree image content represented by one or more projection faces arranged in a 360-degree Virtual Reality (360 VR) projection layout, and then the resulting frame is encoded into a bitstream for transmission. Chroma subsampling is a video encoding technique that adopts less resolution for chroma information than for luma information, taking advantage of the human visual system's lower acuity for color difference than for luminance. To put it another way, chroma subsampling is a type of compression that reduces the color information in a signal, thus reducing the bandwidth without significantly affecting the picture quality. For example, a video encoder may encode a projection-based frame in a 4:2:0 chroma format or a 4:2:2 chroma format into the bitstream for transmission. Thus, there is a need for an innovative design that imposes constraints on a projection-based frame when chroma subsampling is employed for adopting less resolution for chroma information.

SUMMARY

One of the objectives of the claimed invention is to provide a video decoding method for decoding a part of a bitstream to generate a projection-based frame with a constrained picture size and an associated electronic device.

According to a first aspect of the present invention, an exemplary video decoding method is disclosed. The exemplary video decoding method includes decoding a part of a bitstream to generate a decoded frame, wherein the decoded frame is a projection-based frame that comprises a plurality of projection faces packed in a projection layout with M projection face columns and N projection face rows, M and N are positive integers, and at least a portion of a 360-degree content of a sphere is mapped to said plurality of projection faces via projection. Regarding the decoded frame, a picture width excluding guard band samples is equal to an integer multiple of M, and a picture height excluding guard band samples is equal to an integer multiple of N.

According to a second aspect of the present invention, an exemplary video decoding method is disclosed. The exemplary video decoding method includes decoding a part of a bitstream to generate a decoded frame, wherein the decoded frame is a projection-based frame that comprises a plurality of projection faces packed in a hemisphere cubemap projection layout, and a portion of a 360-degree content of a sphere is mapped to said plurality of projection faces via hemisphere cubemap projection. Regarding the decoded frame, one of a picture width excluding guard band samples and a picture height excluding guard band samples is equal to an integer multiple of 6.

According to a third aspect of the present invention, an exemplary electronic device is disclosed. The exemplary electronic device includes a decoding circuit arranged to decode a part of a bitstream to generate a decoded frame, wherein the decoded frame is a projection-based frame that comprises a plurality of projection faces packed in a projection layout with M projection face columns and N projection face rows, M and N are positive integers, and at least a portion of a 360-degree content of a sphere is mapped to said plurality of projection faces via projection. Regarding the decoded frame, a picture width excluding guard band samples is equal to an integer multiple of M, and a picture height excluding guard band samples is equal to an integer multiple of N.

According to a fourth aspect of the present invention, an exemplary electronic device is disclosed. The exemplary electronic device includes a decoding circuit arranged to decode a part of a bitstream to generate a decoded frame, wherein the decoded frame is a projection-based frame that comprises a plurality of projection faces packed in a hemisphere cubemap projection layout, and a portion of a 360-degree content of a sphere is mapped to said plurality of projection faces via hemisphere cubemap projection. Regarding the decoded frame, one of a picture width excluding guard band samples and a picture height excluding guard band samples is equal to an integer multiple of 6.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4-6 are diagrams illustrating one specification of guard bands packed in a regular cubemap projection or a hemisphere cubemap projection according to an embodiment of the present invention.

FIGS. 7-9 are diagrams illustrating another specification of guard bands packed in a regular cubemap projection or a hemisphere cubemap projection according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
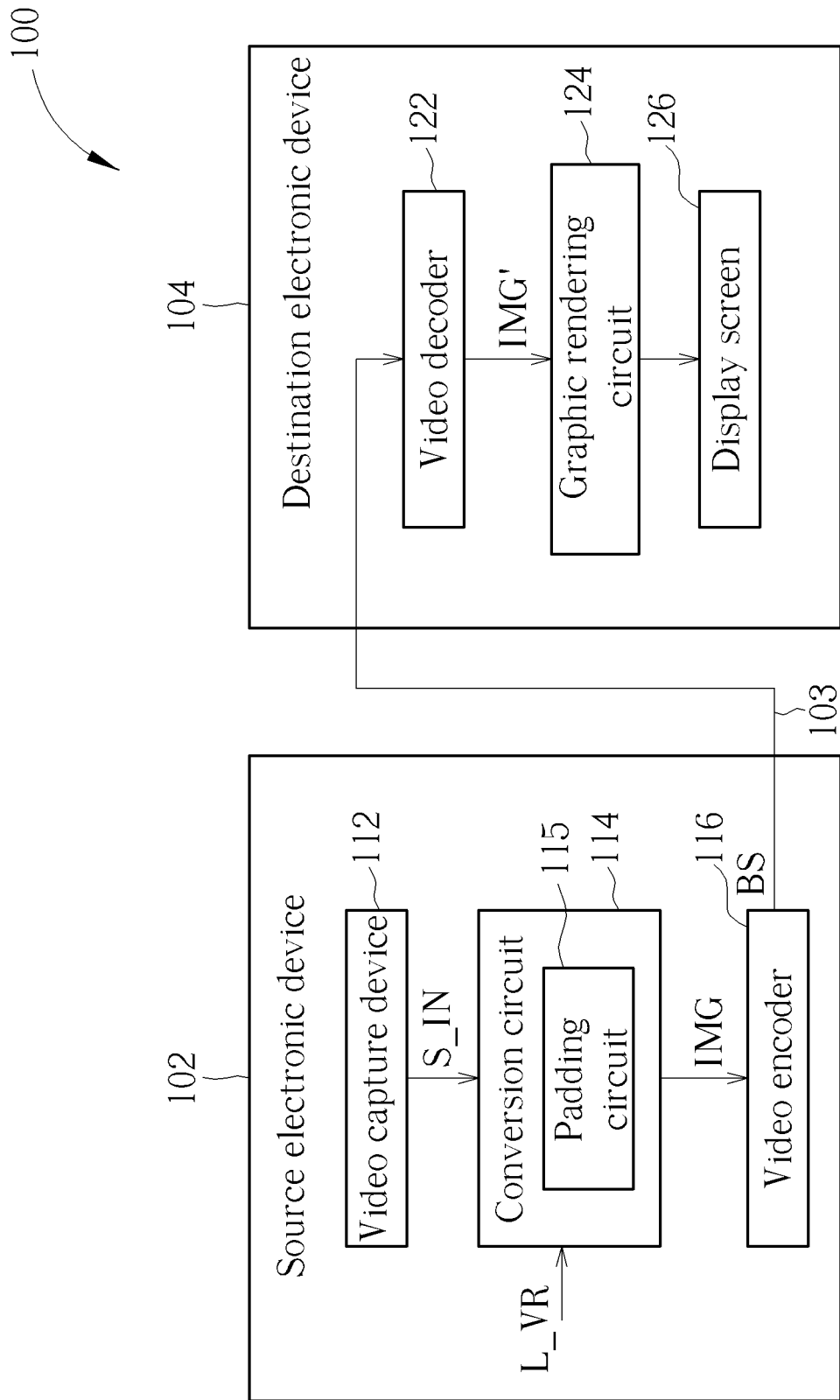
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional image content S_IN. For example, the projection-based frame IMG may be one frame included in a sequence of projection-based frames generated from the conversion circuit 114. The video encoder 116 is an encoding circuit used to encode/compress the projection-based frames IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display screen 126. The video decoder 122 is a decoding circuit used to receive the bitstream BS from the transmission means 103 (e.g., wired/wireless communication link or storage medium), and decode a part of the received bitstream BS to generate a decoded frame IMG'. For example, the video decoder 122 generates a sequence of decoded frames by decoding the received bitstream BS, where the decoded frame IMG' is one frame included in the sequence of decoded frames. In this embodiment, the projection-based frame IMG to be encoded at the encoder side has a 360 VR projection format with a projection layout. Hence, after the bitstream BS is decoded at the decoder side, the decoded frame IMG' has the same 360 VR projection format and the same projection layout. The graphic rendering circuit 124 is coupled between the video decoder 122 and the display screen 126. The graphic rendering circuit 124 renders and displays an output image data on the display screen 126 according to the decoded frame IMG'. For example, a viewport area associated with a portion of the 360-degree image content carried by the decoded frame IMG' may be displayed on the display screen 126 via the graphic rendering circuit 124.

As mentioned above, the conversion circuit 114 generates the projection-based frame IMG according to the 360 VR projection layout L_VR and the omnidirectional image content S_IN. In this embodiment, the 360 VR projection layout L_VR may be selected from a group consisting of a cube-based projection layout with/without guard band (s), a triangle-based projection layout with/without guard band(s), a segmented sphere projection layout with/without guard band(s), a rotated sphere projection layout with/without guard band (s), a viewport-dependent projection layout with/without guard band(s), an equi-rectangular projection layout with/without guard band (s), an equi-angular cubemap projection layout with/without guard band (s), and an equatorial cylindrical projection layout with/without guard band(s). For example, the 360 VR projection layout L_VR may be set by a regular cubemap projection layout with/without guard band(s) or a hemisphere cubemap projection layout with/without guard band (s).

Consider a case where the 360 VR projection layout L_VR is a cube-based projection layout. Hence, at least a portion (i.e., part or all) of a 360-degree content of a sphere is mapped to projection faces via cube-based projection, and the projection faces derived from different faces of a three-dimensional object (e.g., a cube or a hemisphere cube) are packed in the two-dimensional cube-based projection layout that is employed by the projection-based frame IMG/decoded frame IMG'.

Figure 2:
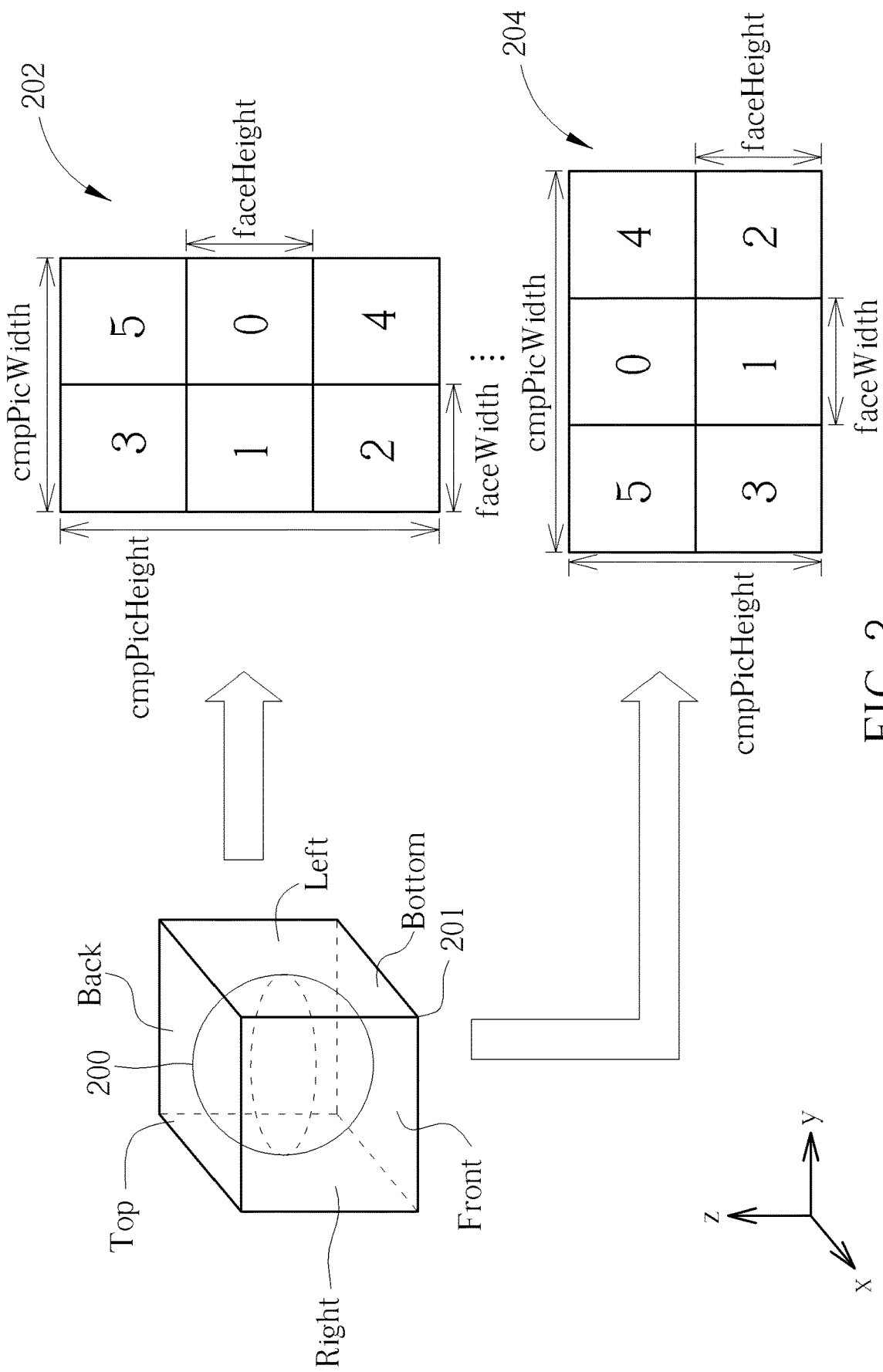
FIG. 2 is a diagram illustrating a cube-based projection according to an embodiment of the present invention.

In one embodiment, cube-based projection with six square projection faces representing full 360°×180° omnidirectional video (i.e., all of a 360-degree content of a sphere) may be employed. Regarding the conversion circuit 114 of the source electronic device 102, cube-based projection is employed to generate square projection faces of a cube in a three-dimensional (3D) space. FIG. 2 is a diagram illustrating a cube-based projection according to an embodiment of the present invention. The whole 360-degree content on the sphere 200 is projected onto six square faces of a cube 201, including a top face (labeled by "Top"), a bottom face (labeled by "Bottom"), a left face (labeled by "Left"), a front face (labeled by "Front"), a right face (labeled by "Right"), and a back face (labeled by "Back"). As shown in FIG. 2, an image content of a north polar region of the sphere 200 is projected onto the top face "Top", an image content of a south polar region of the sphere 200 is projected onto the bottom face "Bottom", and an image content of an equatorial region of the sphere 200 is projected onto the left face "Left", the front face "Front", the right face "Right", and the back face "Back".

Forward transformation may be used to transform from the 3D space to the 2D plane. Hence, the top face "Top", bottom face "Bottom", left face "Left", front face "Front", right face "Right", and back face "Back" of the cube 201 in the 3D space are transformed into a top face (labeled by "2"), a bottom face (labeled by "3"), a left face (labeled by "5"), a front face (labeled by "0"), a right face (labeled by "4"), and a back face (labeled by "1") on the 2D plane.

Inverse transformation may be used to transform from the 2D plane to the 3D space. Hence, the top face (labeled by "2"), the bottom face (labeled by "3"), the left face (labeled by "5"), the front face (labeled by "0"), the right face (labeled by "4"), and the back face (labeled by "1") on the 2D plane are transformed into the top face "Top", bottom face "Bottom", left face "Left", front face "Front", right face "Right", and back face "Back" of the cube 201 in the 3D space.

The inverse transformation can be employed by the conversion circuit 114 of the source electronic device 102 for generating the top face "2", bottom face "3", left face "5", front face "0", right face "4", and back face "1". The top face "2", bottom face "3", left face "5", front face "0", right face "4", and back face "1" on the 2D plane are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR adopted at the encoder side. Regarding the graphic rendering circuit 124 of the destination electronic device 104, forward transformation can be used to transform from the 3D space to the 2D plane for determining pixel values of pixels in any of the top face "Top", bottom face "Bottom", left face "Left", front face "Front", right face "Right", and back face "Back". Or the inverse transformation can be used to transform from the 2D plane to the 3D space for remapping the sample locations of a projection-based frame to the sphere.

As mentioned above, the top face "2", bottom face "3", left face "5", front face "0", right face "4", and back face "1" are packed to form the projection-based frame IMG. For example, the conversion circuit 114 may select one packing type, such that the projection-based frame IMG may have projected image data arranged in the cube-based projection layout 202, where the projection-based frame IMG with the cube-based projection layout 202 has a picture height cmpPicHeight and a picture width cmpPicWidth, and each square face packed in the cube-based projection layout 202 has a face height faceHeight and a face width faceWidth. For another example, the conversion circuit 114 may select another packing type, such that the projection-based frame IMG may have projected image data arranged in the cube-based projection layout 204 that is different from the cube-based projection layout 202, where the projection-based frame IMG with the cube-based projection layout 204 has a picture height cmpPicHeight and a picture width cmpPicWidth, and each square face packed in the cube-based projection layout 204 has a face height faceHeight and a face width faceWidth.

Figure 3:
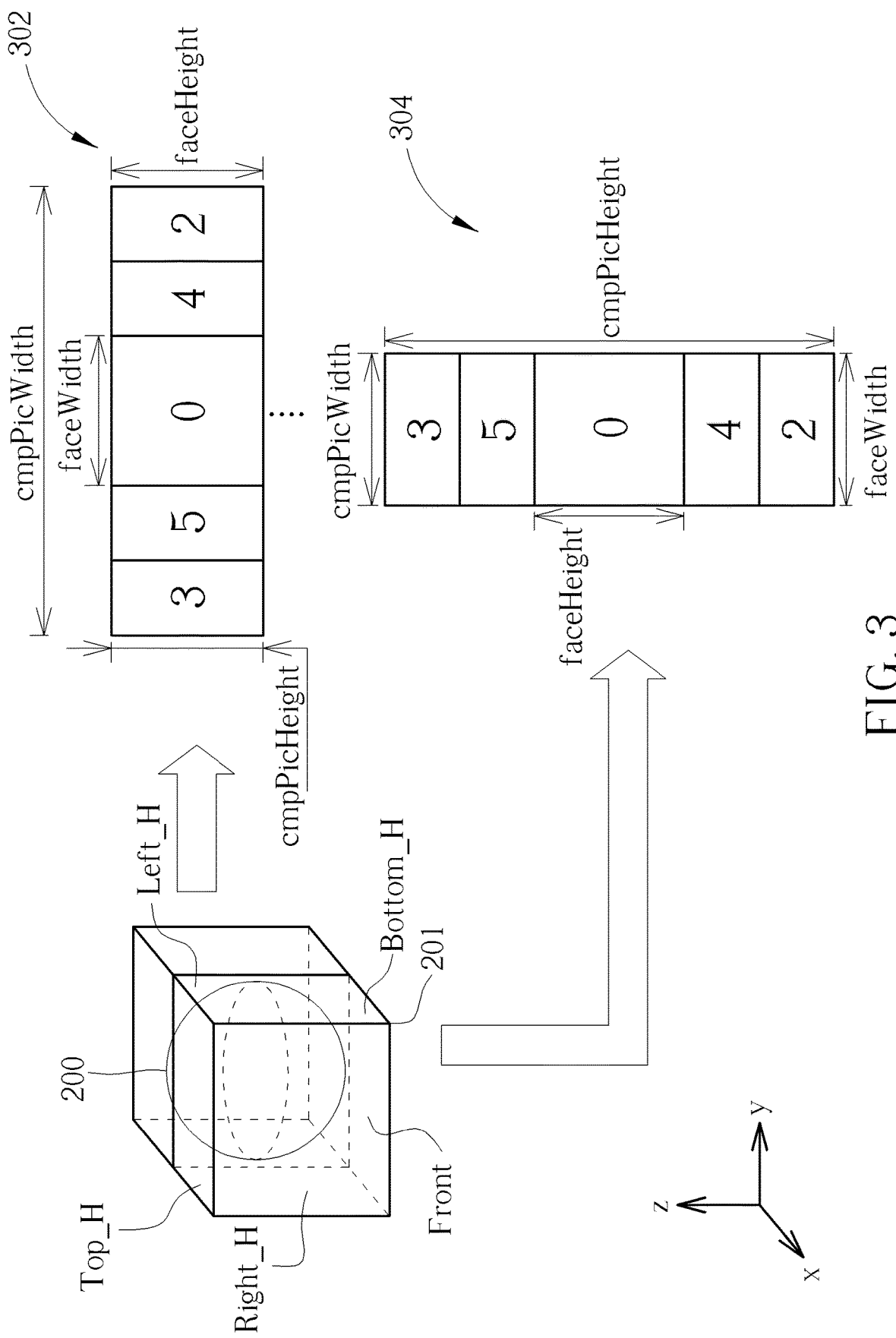
FIG. 3 is a diagram illustrating another cube-based projection according to an embodiment of the present invention.

In another embodiment, cube-based projection with five projection faces (which include one full face and four half faces) representing 180°×180° omnidirectional video (i.e., part of a 360-degree content of a sphere) may be employed. Regarding the conversion circuit 114 of the source electronic device 102, cube-based projection is employed to generate one full face and four half faces of a cube in a 3D space. FIG. 3 is a diagram illustrating another cube-based projection according to an embodiment of the present invention. Only a half of the 360-degree content on the sphere 200 is projected onto faces of a cube 201, including a top half face (labeled by "Top_H"), a bottom half face (labeled by "Bot-tom_H"), a left half face (labeled by "Left_H"), a front full face (labeled by "Front"), and a right half face (labeled by "Right_H"). In this example, a hemisphere cube (e.g., a half of the cube 201) is employed for hemisphere cubemap projection, where a hemisphere (e.g., a half of the sphere 200) is inscribed in the hemisphere cube (e.g., half of the cube 201). As shown in FIG. 3, an image content of a half of a north polar region of the sphere 200 is projected onto the top half face "Top_H", an image content of a half of a south polar region of the sphere 200 is projected onto the bottom half face "Bottom_H", and an image content of a half of an equatorial region of the sphere 200 is projected onto the left half face "Left_H", the front full face "Front", and the right half face "Right_H".

Forward transformation may be used to transform from the 3D space to the 2D plane. Hence, the top half face "Top_H", bottom half face "Bottom_H", left half face "Left_H", front full face "Front", and right half face "Right_H" of the cube 201 in the 3D space are transformed into a top half face (labeled by "2"), a bottom half face (labeled by "3"), a left half face (labeled by "5"), a front full face (labeled by "0"), and a right half face (labeled by "4") on the 2D plane. In addition, a size of the front full face (labeled by "0") is twice as large as a size of each of top half face (labeled by "2"), bottom half face (labeled by "3"), left half face (labeled by "5"), and right half face (labeled by "4").

Inverse transformation may be used to transform from the 2D plane to the 3D space. Hence, the top half face (labeled by "2"), the bottom half face (labeled by "3"), the left half face (labeled by "5"), the front full face (labeled by "0"), and the right half face (labeled by "4") on the 2D plane are transformed into the top half face "Top_H", bottom half face "Bottom_H", left half face "Left_H", front full face "Front", and right half face "Right_H" of the cube 201 in the 3D space.

The inverse transformation can be employed by the conversion circuit 114 of the source electronic device 102 for generating the top half face "2", bottom half face "3", left half face "5", front full face "0", and right half face "4". The top half face "2", bottom half face "3", left half face "5", front full face "0", and right half face "4" on the 2D plane are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR adopted at the encoder side. Regarding the graphic rendering circuit 124 of the destination electronic device 104, forward transformation can be used to transform from the 3D space to the 2D plane for determining pixel values of pixels in any of the top half face "Top_H", bottom half face "Bottom_H", left half face "Left_H", front full face "Front", and right half face "Right_H". Or the inverse transformation can be used to transform from the 2D plane to the 3D space for remapping the sample locations of a projection-based frame to the sphere.

As mentioned above, the top half face "2", bottom half face "3", left half face "5", front full face "0", and right half face "4" are packed to form the projection-based frame IMG. For example, the conversion circuit 114 may select one packing type, such that the projection-based frame IMG may have projected image data arranged in the cube-based projection layout 302, where the projection-based frame IMG with the cube-based projection layout 302 has a picture height cmpPicHeight and a picture width cmpPicWidth, and the square face (i.e., full face) packed in the cube-based projection layout 302 has a face height faceHeight and a face width faceWidth. For another example, the conversion circuit 114 may select another packing type, such that the projection-based frame IMG may have projected image data arranged in the cube-based projection layout 304 that is different from the cube-based projection layout 302, where the projection-based frame IMG with the cube-based projection layout 304 has a picture height cmpPicHeight and a picture width cmpPicWidth, and the square face (i.e., full face) packed in the cube-based projection layout 304 has a face height faceHeight and a face width faceWidth. In the following, the cube-based projection layout 302 is also referred to as a horizontally packed hemisphere cubemap projection layout having all projection faces packed horizontally, and the cube-based projection layout 304 is also referred to as a vertically packed hemisphere cubemap projection layout having all projection faces packed vertically. In this embodiment, the front face is selected as the full face that is packed in the cube-based projection layout 302/304. In practice, the full face packed in the cube-based projection layout 302/304 may be any of the top face, the bottom face, the front face, the back face, the left face, and the right face, and the four half faces packed in the cube-based projection layout 302/304 depend on the selection of the full face.

Regarding the embodiment shown in FIG. 2, projection faces are packed in a regular CMP layout without guard bands (or padding) 202/204. Regarding the embodiment shown in FIG. 3, projection faces are packed in a hemisphere CMP layout without guard bands (or padding) 302/304. However, the projection-based frame IMG after coding may have artifacts due to discontinuous layout boundaries of the CMP layout (which may be a regular CMP layout or a hemisphere CMP layout) and/or discontinuous edges of the CMP layout (which may be a regular CMP layout or a hemisphere CMP layout). For example, the CMP layout without guard bands (or padding) has a top discontinuous layout boundary, a bottom discontinuous layout boundary, a left discontinuous layout boundary, and a right discontinuous layout boundary. In addition, there is at least one image content discontinuous edge between two adjacent projection faces packed in the CMP layout without guard bands (or padding). Taking the cube-based projection layout 202/204 for example, one discontinuous edge exists between one face boundary of the bottom face "3" and one face boundary of the left face "5", one discontinuous edge exists between one face boundary of the back face "1" and one face boundary of the front face "0", and one discontinuous edge exists between one face boundary of the top face "2" and one face boundary of the right face "4". Taking the cube-based projection layout 302/304 for example, one discontinuous edge exists between one face boundary of the bottom face "3" and one face boundary of the left face "5", and one discontinuous edge exists between one face boundary of the right face "4" and one face boundary of the top face "2".

To address this issue, the 360 VR projection layout L_VR may be set by a projection layout with at least one guard band (or padding) such as a cube-based projection layout with guard bands (or padding). For example, around layout boundaries and/or discontinuous edges, additional guard bands generated by, for example, pixel padding may be inserted for reducing the seam artifacts. Alternatively, around layout boundaries and/or continuous edges, additional guard bands generated by, for example, pixel padding may be inserted. To put it simply, the location of each guard band added to a projection layout may depend on actual design considerations. Regarding a projection-based frame with a constrained guard band size, a constrained projection face size, and/or a constrained picture size, the present invention has no limitations on the number of guard bands and the location of each guard band when a projection layout with guard band(s) (or padding) is employed.

In this embodiment, the conversion circuit 114 has a padding circuit 115 that is arranged to generate at least one padding region (i.e., at least one guard band). The conversion circuit 114 creates the projection-based frame IMG by packing the projection faces and at least one padding region (i.e., at least one guard band) in the 360 VR projection layout L_VR. For example, the conversion circuit 114 determines a guard band configuration of the projection-based frame IMG that consists of projection faces derived from cube-based projection (e.g., regular cubemap projection shown in FIG. 2 or hemisphere cubemap projection shown in FIG. 3), and the decoded frame IMG' is a projection-based frame that is generated from the video decoder 122 and has a guard band configuration identical to that of the projection-based frame IMG received and encoded by the video encoder 116.

Figure 4:
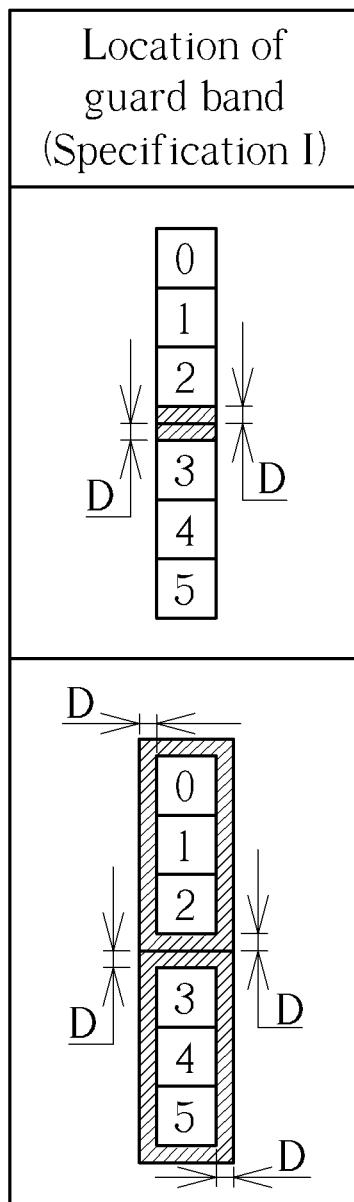
Figure 5:
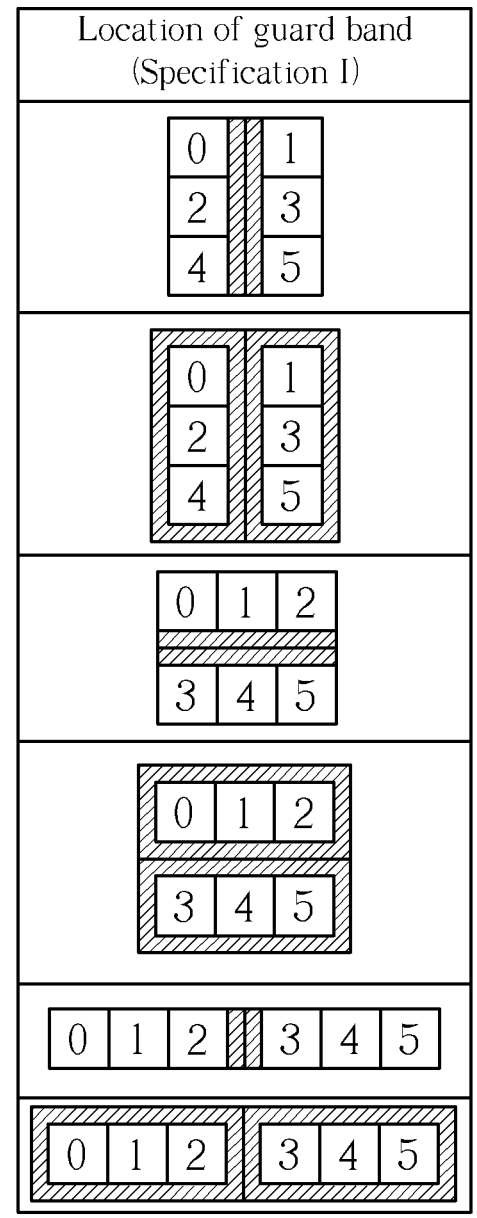

FIGS. 4-6 are diagrams illustrating one specification of guard bands packed in a regular cubemap projection or a hemisphere cubemap projection according to an embodiment of the present invention. As shown in a top part of FIG. 4, a first guard band is added to a bottom face boundary of a first projection face packed at a face position with the position index 2, and a second guard band is added to a top face boundary of a second projection face packed at a face position with the position index 3, where the first guard band and the second guard band have the same guard band size D (i.e., the same number of guard band samples). If the bottom face boundary of the first projection face directly connects with the top face boundary of the second projection face, an edge (e.g., a discontinuous edge or a continuous edge) exists between the first projection face and the second projection face. Guard bands can be added to the edge between the first projection face and the second projection face. For example, regarding a cube in a 3D space, the bottom face boundary of the first projection face (which is one square face of the cube) may be connected with or may not be connected with the top face boundary of the second projection face (which is another square face of the cube); and regarding a cube-based projection layout on a 2D plane, the bottom face boundary of the first projection face is parallel with the top face boundary of the second projection face, and the first guard band and the second guard band are both between the first projection face and the second projection face for isolating the bottom face boundary of the first projection face from the top face boundary of the second projection face, where the first guard band connects with the bottom face boundary of the first projection face and the second guard band, and the second guard band connects with the first guard band and the top face boundary of the second projection face. Hence, the width of one guard band area (which consists of the first guard band and the second guard) inserted between the first projection face (which is packed at the face position with the position index 2) and the second projection face (which is packed at the face position with the position index 3) is equal to 2*D.

As shown in a bottom part of FIG. 4, a first guard band is added to a bottom face boundary of a projection face packed at a face position with the position index 2, a second guard band is added to a top face boundary of a projection face packed at a face position with the position index 3, a third guard band is added to a top face boundary of a projection face packed at a face position with the position index 0, a fourth guard band is added to a bottom face boundary of a projection face packed at a face position with the position index 5, a fifth guard band is added to left face boundaries of projection faces packed at face positions with the position indexes 0-5, and a sixth guard band is added to right face boundaries of projection faces packed at face positions with the position indexes 0-5, where the first guard band, the second guard band, the third guard band, the fourth guard band, the fifth guard band, and the sixth guard band have the same guard band size D (i.e., the same number of guard band samples). Specifically, the third guard band, the fourth guard band, the fifth guard band, and the sixth guard band act as boundaries of the cube-based projection layout. In addition, the width of one guard band area (which consists of two guard bands) inserted between two projection faces (which are packed at face positions with position indexes 2 and 3) is equal to 2*D.

Since a person skilled in the art can readily understand details of other guard band configurations shown in FIG. 5 and FIG. 6 after reading above paragraphs, further description is omitted here for brevity. A projection-based frame having a cubemap projection layout with guard bands (e.g., one of the cubemap projection layouts shown in FIGS. 4-6) may have a picture width excluding guard band samples that is equivalent to a picture width of a projection-based frame having a cubemap projection layout with no guard bands in the width direction, and/or may have a picture height excluding guard band samples that is equivalent to a picture height of a projection-based frame having a cubemap projection layout with no guard bands in the height direction.

Figure 8:
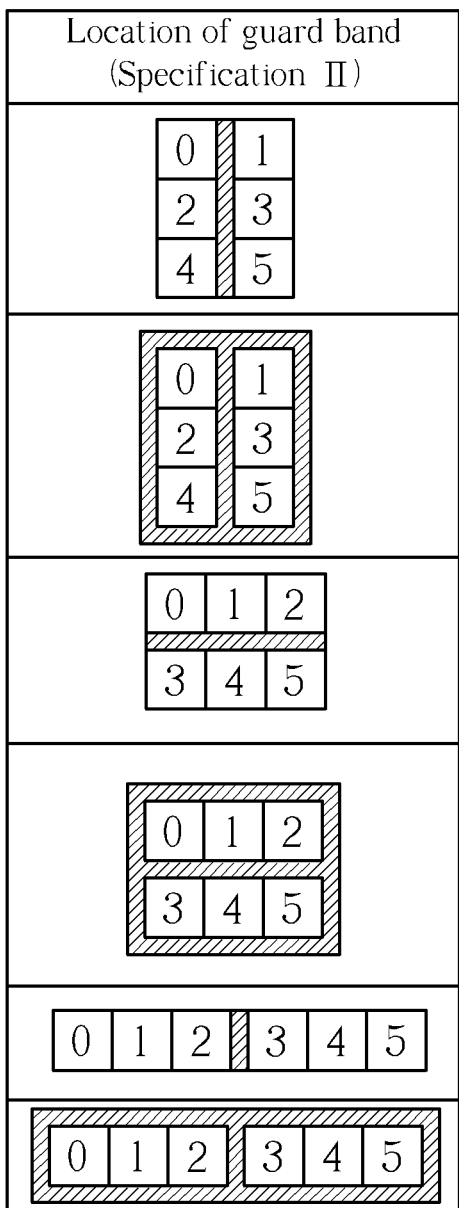
Figure 9:
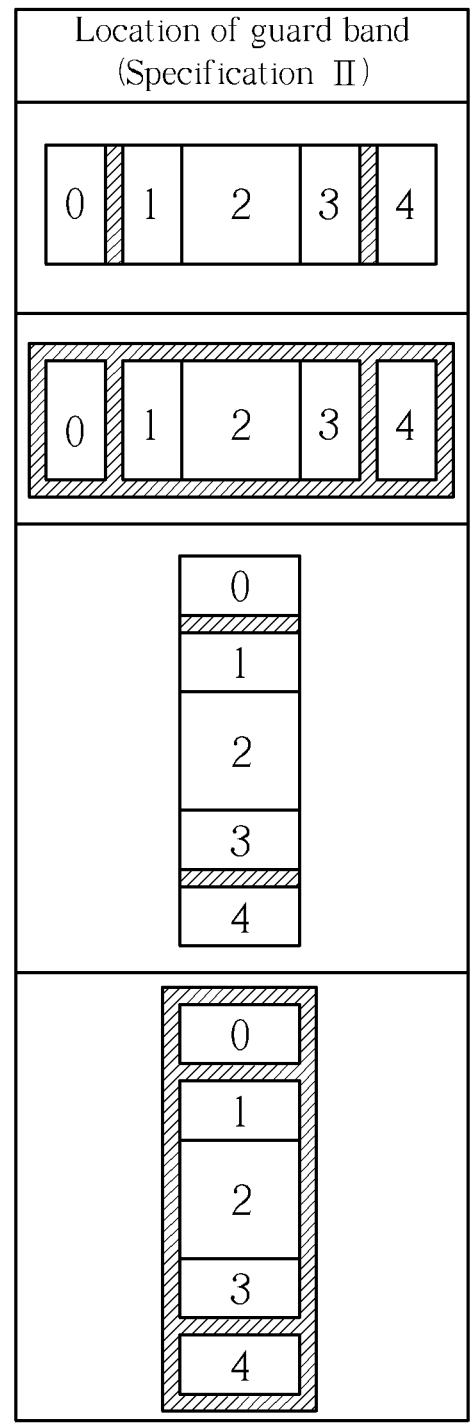

FIGS. 7-9 are diagrams illustrating another specification of guard bands packed in a regular cubemap projection or a hemisphere cubemap projection according to an embodiment of the present invention. The major difference between the guard band configurations shown in FIGS. 4-6 and the guard band configurations shown in FIGS. 7-9 is that a single guard band is added to an edge (e.g., a discontinuous edge or a continuous edge) between two adjacent projection faces packed in a cube-based projection layout. As shown in a top part of FIG. 7, a guard band is inserted between a bottom face boundary of a first projection face packed at a face position with the position index 2 and a top face boundary of a second projection face packed at a face position with the position index 3, where the guard band has the guard band size D (i.e., the same number of guard band samples). If the bottom face boundary of the first projection face directly connects with the top face boundary of the second projection face, an edge (e.g., a discontinuous edge or a continuous edge) exists between the first projection face and the second projection face. One guard band can be added to the edge between the first projection face and the second projection face. For example, regarding a cube in a 3D space, the bottom face boundary of the first projection face (which is one square face of the cube) may be connected with or may not be connected with the top face boundary of the second projection face (which is another square face of the cube); and regarding a cube-based projection layout on a 2D plane, the bottom face boundary of the first projection face is parallel with the top face boundary of the second projection face, and the guard band is between the first projection face and the second projection face for isolating the bottom face boundary of the first projection face from the top face boundary of the second projection face, where the guard band connects with the bottom face boundary of the first projection face and also connects with the top face boundary of the second projection face. Hence, the width of one guard band area (which consists of a single guard band) inserted between the first projection face (which is packed at the face position with the position index 2) and the second projection face (which is packed at the face position with the position index 3) is equal to D.

As shown in a bottom part of FIG. 7, a first guard band is added between a bottom face boundary of a projection face packed at a face position with the position index 2 and a top face boundary of a projection face packed at a face position with the position index 3, a second guard band is added to a top face boundary of a projection face packed at a face position with the position index 0, a third guard band is added to a bottom face boundary of a projection face packed at a face position with the position index 5, a fourth guard band is added to left face boundaries of projection faces packed at face positions with the position indexes 0-5, and a fifth guard band is added to right face boundaries of projection faces packed at face positions with the position indexes 0-5, where the first guard band, the second guard band, the third guard band, the fourth guard band, and the fifth guard band have the same guard band size D (i.e., the same number of guard band samples). Specifically, the second guard band, the third guard band, the fourth guard band, and the fifth guard band act as boundaries of the cube-based projection layout. In addition, the width of one guard band area (which consists of a single guard band) inserted between two projection faces (which are packed at the face positions with the position indexes 2 and 3) is equal to D.

Since a person skilled in the art can readily understand details of other guard band configurations shown in FIG. 8 and FIG. 9 after reading above paragraphs, further description is omitted here for brevity. A projection-based frame having a cubemap projection layout with guard bands (e.g., one of the cubemap projection layouts shown in FIGS. 7-9) may have a picture width excluding guard band samples equal to a picture width of a projection-based frame having a modified cubemap projection layout without the guard bands, and/or may have a picture height excluding guard band samples equal to a picture height of a projection-based frame having a modified cubemap projection layout without the guard bands.

As mentioned above, chroma subsampling is a type of compression that reduces the color information in a signal for reducing the bandwidth without significantly affecting the picture quality. For example, the conversion circuit 114 may perform RGB-to-YCrCb conversion and chroma subsampling, and the video encoder 116 may encode the projection-based frame IMG in a 4:2:0 chroma format or a 4:2:2 chroma format into the bitstream BS for transmission. Regarding the guard band configuration, the conversion circuit 114 may impose constraints on the guard band size D of each guard band packed in the projection-based frame IMG, and the video decoder 122 may ignore/discard a bitstream that does not follow the constraints. Assuming that the projection-based frame IMG is in a 4:2:0 chroma format or a 4:2:2 chroma format, the guard band size D of each guard band packed in the projection-based frame IMG may be constrained to be an even number of luma samples. The projection-based frame IMG in the 4:2:0 chroma format (or the 4:2:2 chroma format) is encoded into the bitstream BS. Since the decoded frame IMG' is a projection-based frame derived from decoding the bitstream BS, the decoded frame IMG' is also in the 4:2:0 chroma format (or the 4:2:2 chroma format), and the guard band size D of each guard band packed in the decoded frame IMG' is also equal to an even number of luma samples.

The video encoder 116 may signal syntax element(s) associated with the guard band configuration of the projection-based frame IMG via the bitstream BS, where the guard band configuration includes the guard band size D. Hence, the video decoder 122 can parse the syntax element(s) associated with the guard band configuration from the bitstream BS. For example, the syntax element gcmp_guard_band_samples_minus1 is arranged to provide size information of each guard band packed in the projection-based frame (e.g., IMG or IMG') having a cube-based projection layout. For example, gcmp_guard_band_samples_minus1 plus 1 specifies the number of guard band samples, in units of luma samples, used in the cubemap projected picture. When the parameter ChromaFormatIdc is equal to 1 (4:2:0 chroma format) or 2 (4:2:2 chroma format), gcmp_guard_band_samples_minus1 plus 1 shall correspond to an even number of luma samples. That is, when the 4:2:0 chroma format or 4:2:2 chroma format is used, gcmp_guard_band_samples_minus1 plus 1 shall correspond to an even number of luma samples.

It should be noted that the proposed guard band size constraint may be applied to any projection layout with guard band(s) to ensure that a guard band size of each guard band packed in a projection-based frame is constrained to be an even number of luma samples when the projection-based frame is in a 4:2:0 chroma format or a 4:2:2 chroma format.

In some embodiments of the present invention, when the projection-based frame IMG is chroma subsampled, the conversion circuit 114 may impose constraints on the projection face size, and the video decoder 122 may ignore/discard a bitstream that does not follow the constraints. For example, when a projection-based frame (IMG or IMG') is in a 4:2:0 chroma format or a 4:2:2 chroma format, a face width of each projection face packed in the projection-based frame (IMG or IMG') is equal to an even number of luma samples. For another example, when a projection-based frame (IMG or IMG') is in a 4:2:0 chroma format, a face height of each projection face packed in the projection-based frame (IMG or IMG') is equal to an even number of luma samples. It should be noted that the proposed projection face size constraint may be applied to any projection layout with/without guard band(s).

Consider a first case where constraints are imposed on faces packed in a projection-based frame (IMG or IMG') with a cube-based projection layout (e.g., regular CMP layout or hemisphere CMP layout). When the parameter ChromaFormatIdc is equal to 1 (4:2:0 chroma format) or 2 (4:2:2 chroma format), the width of each face packed in the projection-based frame (IMG or IMG') shall correspond to an even number of luma samples. When the parameter ChromaFormatIdc is equal to 1 (4:2:0 chroma format), the height of each face packed in the projection-based frame (IMG or IMG') shall correspond to an even number of luma samples.

Consider a second case where constraints are imposed on faces packed in a projection-based frame (IMG or IMG') with a cube-based projection layout (e.g., regular CMP layout or hemisphere CMP layout), and faceWidth and faceHeight represent width and height of a square projection face included in projection faces packed in the cube-based projection layout. When the parameter ChromaFormatIdc is equal to 1 (4:2:0 chroma format) or 2 (4:2:2 chroma format), faceWidth shall be an integer multiple of 4 in units of luma samples. When the parameter ChromaFormatIdc is equal to 1 (4:2:0 chroma format), faceHeight shall be an integer multiple of 4 in units of luma samples.

Consider a third case where constraints are imposed on faces packed in a projection-based frame (IMG or IMG') with a cube-based projection layout (e.g., regular CMP layout or hemisphere CMP layout), and faceWidth and faceHeight represent width and height of a square projection face included in projection faces packed in the cube-based projection layout. If the horizontally packed hemisphere cubemap layout is employed, the following constraints apply:

when the parameter ChromaFormatIdc is equal to 1 (4:2:0 chroma format) or 2 (4:2:2 chroma format), faceWidth shall be an integer multiple of 4 in units of luma samples; and when the parameter ChromaFormatIdc is equal to 1 (4:2:0 chroma format), faceHeight shall be an integer multiple of 2 in units of luma samples.

If the vertically packed hemisphere cubemap layout is employed, the following constraints apply:

when the parameter ChromaFormatIdc is equal to 1 (4:2:0 chroma format) or 2 (4:2:2 chroma format), faceWidth shall be an integer multiple of 2 in units of luma samples; and when the parameter ChromaFormatIdc is equal to 1 (4:2:0 chroma format), faceHeight shall be an integer multiple of 4 in units of luma samples.

If the regular cubemap layout is employed, the following constraints apply:

when the parameter ChromaFormatIdc is equal to 1 (4:2:0 chroma format) or 2 (4:2:2 chroma format), faceWidth shall be an integer multiple of 2 in units of luma samples; and when the parameter ChromaFormatIdc is equal to 1 (4:2:0 chroma format), faceHeight shall be an integer multiple of 2 in units of luma samples.

Consider a fourth case where constraints are imposed on faces packed in a projection-based frame (IMG or IMG') with a hemisphere cubemap projection layout (e.g., horizontally packed hemisphere cubemap projection layout or vertically packed hemisphere cubemap projection layout) including one full face and four half faces. When the parameter ChromaFormatIdc is equal to 1 (4:2:0 chroma format) or 2 (4:2:2 chroma format), the width of each face packed in the hemisphere cubemap projection layout shall be an integer multiple of 2 in units of luma samples. When the parameter ChromaFormatIdc is equal to 1 (4:2:0 chroma format), the height of each face packed in the hemisphere cubemap projection layout shall be an integer multiple of 2 in units of luma samples.

In some embodiments of the present invention, when the projection-based frame IMG includes a plurality of projection faces packed in a projection layout with M projection face columns and N projection face rows (M and N are positive integers), the conversion circuit 114 may impose constraints on the projection size, and the video decoder 122 may ignore/discard a bitstream that does not follow the constraints. For example, when a projection-based frame (IMG or IMG') includes M×N projection faces, a picture width excluding guard band samples cmpPicWidth is equal to an integer multiple of M, and a picture height excluding guard band samples cmpPicHeight is equal to an integer multiple of N. It should be noted that the proposed projection size constraint may be applied to any projection layout with/without guard band(s).

Figure 10:
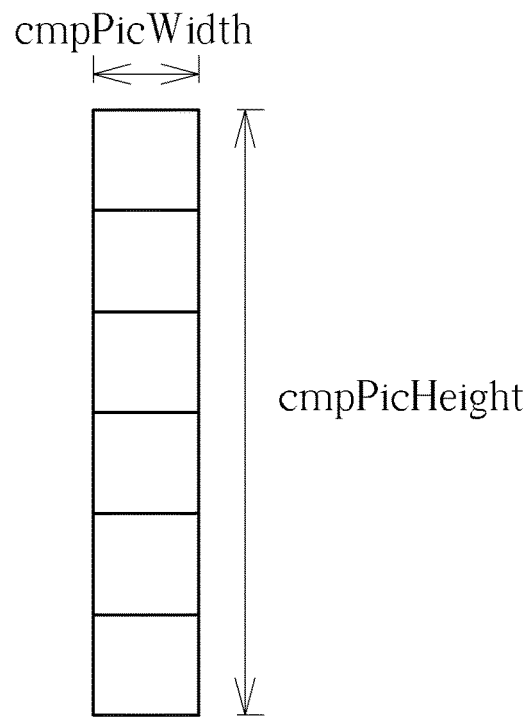
FIG. 10 is a diagram illustrating an example of a 1×6 layout without guard bands.
Figure 11:
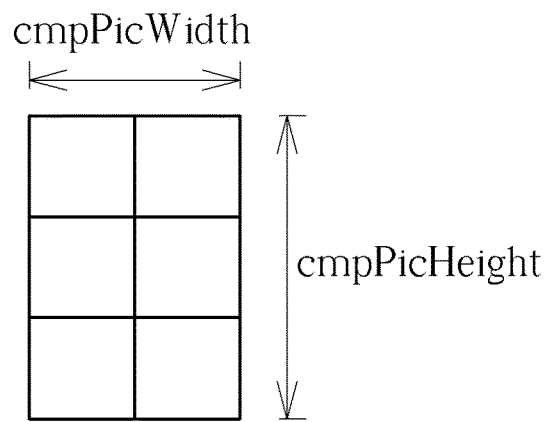
FIG. 11 is a diagram illustrating an example of a 2×3 layout without guard bands.
Figure 12:
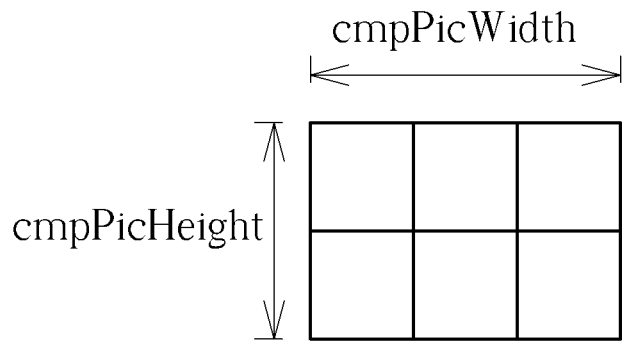
FIG. 12 is a diagram illustrating an example of a 3×2 layout without guard bands.
Figure 13:
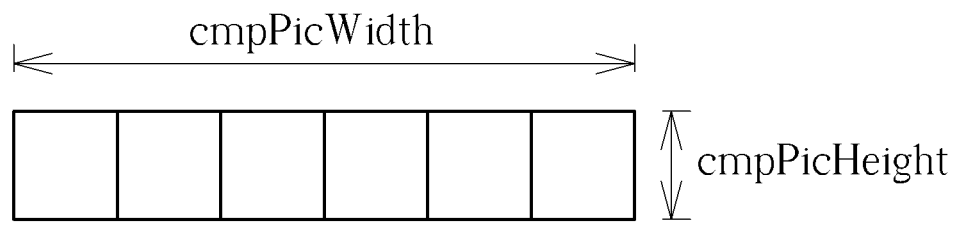
FIG. 13 is a diagram illustrating an example of a 6×1 layout without guard bands.

Consider a first case where constraints are imposed on faces packed in a projection-based frame (IMG or IMG') with a regular cubemap projection layout, where cmpPicWidth is the picture width excluding guard band samples, and cmpPicHeight is the picture height excluding the guard band samples. If the regular cubemap projection layout is set by a 1×6 layout as shown in FIG. 10, cmpPicHeight shall be an integer multiple of 6 (N=6), and cmpPicWidth shall be equal to cmpPicHeight/6. If the regular cubemap projection layout is set by a 2×3 layout as shown in FIG. 11, cmpPicWidth shall be an integer multiple of 2 (M=2) and cmpPicHeight shall be an integer multiple of 3 (N=3), and cmpPicWidth/2 shall be equal to cmpPicHeight/3. If the regular cubemap projection layout is set by a 3×2 layout as shown in FIG. 12, cmpPicWidth shall be an integer multiple of 3 (M=3) and cmpPicHeight shall be an integer multiple of 2 (N=2), and cmpPicWidth/3 shall be equal to cmpPicHeight/2. If the regular projection layout is set by a 6×1 layout as shown in FIG. 13, cmpPicWidth shall be an integer multiple of 6 (M=6), and cmpPicWidth/6 shall be equal to cmpPicHeight.

Consider a second case where the projection-based frame IMG includes one full face and four half faces packed in a hemisphere cubemap projection layout. The conversion circuit 114 may impose constraints on the projection size, and the video decoder 122 may ignore/discard a bitstream that does not follow the constraints. For example, a projection-based frame (IMG or IMG') employs a hemisphere cubemap projection layout, and one of a picture width excluding guard band samples and a picture height excluding guard band samples is equal to an integer multiple of 6. When the hemisphere cubemap projection layout is a horizontally packed hemisphere cubemap projection layout, cmpPicWidth is the picture width excluding guard band samples, and cmpPicHeight is the picture height excluding the guard band samples, cmpPicWidth shall be an integer multiple of 6, and cmpPicWidth/3 shall be equal to cmpPicHeight. When the hemisphere cubemap projection layout is a vertically packed hemisphere cubemap projection layout, cmpPicWidth is the picture width excluding guard band samples, and cmpPicHeight is the picture height excluding the guard band samples, cmpPicHeight shall be an integer multiple of 6, and cmpPicWidth shall be equal to cmpPicHeight/3.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding method comprising:
    decoding a part of a bitstream to generate a decoded frame, wherein the decoded frame is a projection-based frame that comprises a plurality of projection faces packed in a projection layout with M projection face columns and N projection face rows, M and N are positive integers, and at least a portion of a 360-degree content of a sphere is mapped to said plurality of projection faces via projection;
    wherein regarding the decoded frame, a picture width excluding guard band samples is equal to an integer multiple of M, and a picture height excluding guard band samples is equal to an integer multiple of N.

2. The video decoding method of claim 1, wherein said projection is cube-based projection, and the projection layout is a cube-based projection layout.

3. The video decoding method of claim 2, wherein:
    M=1, N=6, and the picture width excluding guard band samples is equal to one sixth of the picture height excluding guard band samples; or
    M=2, N=3, and a half of the picture width excluding guard band samples is equal to one third of the picture height excluding guard band samples; or
    M=3, N=2, and one third of the picture width excluding guard band samples is equal to a half of the picture height excluding guard band samples; or
    M=6, N=1, and the picture height excluding guard band samples is equal to one sixth of the picture width excluding guard band samples.

4. A video decoding method comprising:
    decoding a part of a bitstream to generate a decoded frame, wherein the decoded frame is a projection-based frame that comprises a plurality of projection faces packed in a hemisphere cubemap projection layout, and a portion of a 360-degree content of a sphere is mapped to said plurality of projection faces via hemisphere cubemap projection;
    wherein regarding the decoded frame, one of a picture width excluding guard band samples and a picture height excluding guard band samples is equal to an integer multiple of 6.

5. The video decoding method of claim 4, wherein the hemisphere cubemap projection layout is a horizontally packed hemisphere cubemap projection layout, the picture width excluding guard band samples is equal to an integer multiple of 6, and one third of the picture width excluding guard band samples is equal to the picture height excluding guard band samples.

6. The video decoding method of claim 4, wherein the hemisphere cubemap projection layout is a vertically packed hemisphere cubemap projection layout, the picture height excluding guard band samples is equal to an integer multiple of 6, and one third of the picture height excluding guard band samples is equal to the picture width excluding guard band samples.

7. An electronic device comprising:
    a decoding circuit, arranged to decode a part of a bitstream to generate a decoded frame, wherein the decoded frame is a projection-based frame that comprises a plurality of projection faces packed in a projection layout with M projection face columns and N projection face rows, M and N are positive integers, and at least a portion of a 360-degree content of a sphere is mapped to said plurality of projection faces via projection;
    wherein regarding the decoded frame, a picture width excluding guard band samples is equal to an integer multiple of M, and a picture height excluding guard band samples is equal to an integer multiple of N.

8. The electronic device of claim 7, wherein said projection is cube-based projection, and the projection layout is a cube-based projection layout.

9. The electronic device of claim 8, wherein:
    M=1, N=6, and the picture width excluding guard band samples is equal to one sixth of the picture height excluding guard band samples; or
    M=2, N=3, and a half of the picture width excluding guard band samples is equal to one third of the picture height excluding guard band samples; or
    M=3, N=2, and one third of the picture width excluding guard band samples is equal to a half of the picture height excluding guard band samples; or
    M=6, N=1, and the picture height excluding guard band samples is equal to one sixth of the picture width excluding guard band samples.

10. An electronic device comprising:
- a decoding circuit, arranged to decode a part of a bitstream to generate a decoded frame, wherein the decoded frame is a projection-based frame that comprises a plurality of projection faces packed in a hemisphere cubemap projection layout, and a portion of a 360-degree content of a sphere is mapped to said plurality of projection faces via hemisphere cubemap projection;
- wherein regarding the decoded frame, one of a picture width excluding guard band samples and a picture height excluding guard band samples is equal to an integer multiple of 6.

11. The electronic device of claim 10, wherein the hemisphere cubemap projection layout is a horizontally packed hemisphere cubemap projection layout, the picture width excluding guard band samples is equal to an integer multiple of 6, and one third of the picture width excluding guard band samples is equal to the picture height excluding guard band samples.

12. The electronic device of claim 10, wherein the hemisphere cubemap projection layout is a vertically packed hemisphere cubemap projection layout, the picture height excluding guard band samples is equal to an integer multiple of 6, and one third of the picture height excluding guard band samples is equal to the picture width excluding guard band samples.

* * * * *